(12) United States Patent
Yerramalli et al.

(10) Patent No.: US 12,726,932 B2
(45) Date of Patent: Sep. 1, 2026

(54) CLOSED LOOP FEEDBACK FOR IMPROVED POSITIONING

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US)

(73) Assignee: QUALCOMM Incorproated, San Diego, CA (US)

( * ) Notice: Subject to any disclaimer, the term of this patent is extended or adjusted under 35 U.S.C. 154(b) by 374 days.

(21) Appl. No.: 18/261,100

(22) PCT Filed: Mar. 16, 2022

(86) PCT No.: PCT/US2022/020623
§ 371 (c)(1),
(2) Date: Jul. 11, 2023

(87) PCT Pub. No.: WO2022/197851
PCT Pub. Date: Sep. 22, 2022

(65) Prior Publication Data

US 2024/0073851 A1 Feb. 29, 2024

(30) Foreign Application Priority Data

Mar. 17, 2021 (IN) ............................. 202141011271

(51) Int. Cl.
*H04W 64/00* (2009.01)

(52) U.S. Cl.
CPC .................................. *H04W 64/00* (2013.01)

(58) Field of Classification Search
CPC ....... H04W 4/02; H04W 4/023; H04W 4/029; H04W 64/00
See application file for complete search history.

(56) References Cited

U.S. PATENT DOCUMENTS 10,574,309 B2 2/2020 Akkarakaran et al.
2012/0040696 A1 2/2012 Siomina et al.
(Continued)

FOREIGN PATENT DOCUMENTS

CN 111866927 A 10/2020
EP 3751920 A1 12/2020
(Continued)

OTHER PUBLICATIONS

Interdigital Inc: "Discussion on On-demand Reference Signals for Positioning", 3GPP RAN WG2 Meeting #113-e, R2-2100375, 3GPP, Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021, XP051973561, 4 Pages.
(Continued)

*Primary Examiner* — Sam Bhattacharya
(74) *Attorney, Agent, or Firm* — Polsinelli

(57) ABSTRACT

Disclosed are systems, methods, and non-transitory media for improving user equipment (UE) positioning. In some aspects, UE positioning improvements are facilitated by a location server, such as a Location Management Function (LMF) that receives location measurements from the UE and transmits back a feedback messaging, that can be used to modify transmission of subsequent location measurements to the location server.

45 Claims, 11 Drawing Sheets

(56) References Cited

U.S. PATENT DOCUMENTS

| | | | | |
|---|---|---|---|---|
| 2018/0302873 | A1 | 10/2018 | Kazmi et al. | |
| 2020/0196298 | A1 | 6/2020 | Edge et al. | |
| 2020/0275289 | A1 | 8/2020 | Thangarasa et al. | |
| 2021/0014644 | A1* | 1/2021 | Wu | G01S 5/0205 |
| 2022/0209927 | A1* | 6/2022 | Shreevastav | H04L 5/0069 |

FOREIGN PATENT DOCUMENTS

| | | | |
|---|---|---|---|
| WO | 2018191606 | | 10/2018 |
| WO | 2020168242 | A1 | 8/2020 |
| WO | 2020229567 | A1 | 11/2020 |

OTHER PUBLICATIONS

International Search Report and Written Opinion—PCT/US2022/020623—ISA/EPO—Aug. 23, 2022.

Partial International Search Report—PCT/US2022/020623—ISA/EPO—Jun. 30, 2022.

Taiwan Search Report—TW111109942—TIPO—Jul. 17, 2025.

Ericsson: "Report on [Post112-e][608][POS] Support of on-demand PRS", R2-2101389, 3GPP TSG-RAN WG2 #113e Electronic meeting, Jan. 25-Feb. 5, 2021, Jan. 14, 2021, pp. 1-19.

* cited by examiner

CLOSED LOOP FEEDBACK FOR IMPROVED POSITIONING

FIELD OF THE DISCLOSURE

Aspects of the disclosure relate generally to wireless positioning and the like. In some aspects, examples are described for improving location measurement reporting using feedback provided by a server (e.g., a location server).

BACKGROUND OF THE DISCLOSURE

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for performing wireless positioning using location server (e.g., a location management function (LMF) server) feedback messages. According to at least one example, an apparatus for reporting location measurements, including at least one transceiver, at least one memory, and at least one processor coupled to the at least one transceiver and the at least one memory and configured to: transmit, via the at least one transceiver, a first set of location measurements to a server; receive, via the at least one transceiver, a feedback message from the server based on the first set of location measurements; and transmit, via the at least one transceiver, a second set of location measurements to the server based on the feedback message.

In another example, a computer-implemented method is provided to implement feedback messages provided from a location server, for example, to adjust location measurement reporting by a UE and/or gNB. The computer-implemented method can include: transmitting a first set of location measurements to a server; receiving a feedback message from the server based on the first set of location measurements; and transmitting a second set of location measurements to the server based on the feedback message.

In another example, an apparatus for wireless positioning is provided. The apparatus includes: means for transmitting a first set of location measurements to a server; means for receiving a feedback message from the server based on the first set of location measurements; and means for transmitting a second set of location measurements to the server based on the feedback message.

In another example, a non-transitory computer-readable medium comprising at least one instruction for causing a computer or processor to: transmit a first set of location measurements to a server; receive a feedback message from the server based on the first set of location measurements; and transmit a second set of location measurements to the server based on the feedback message.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
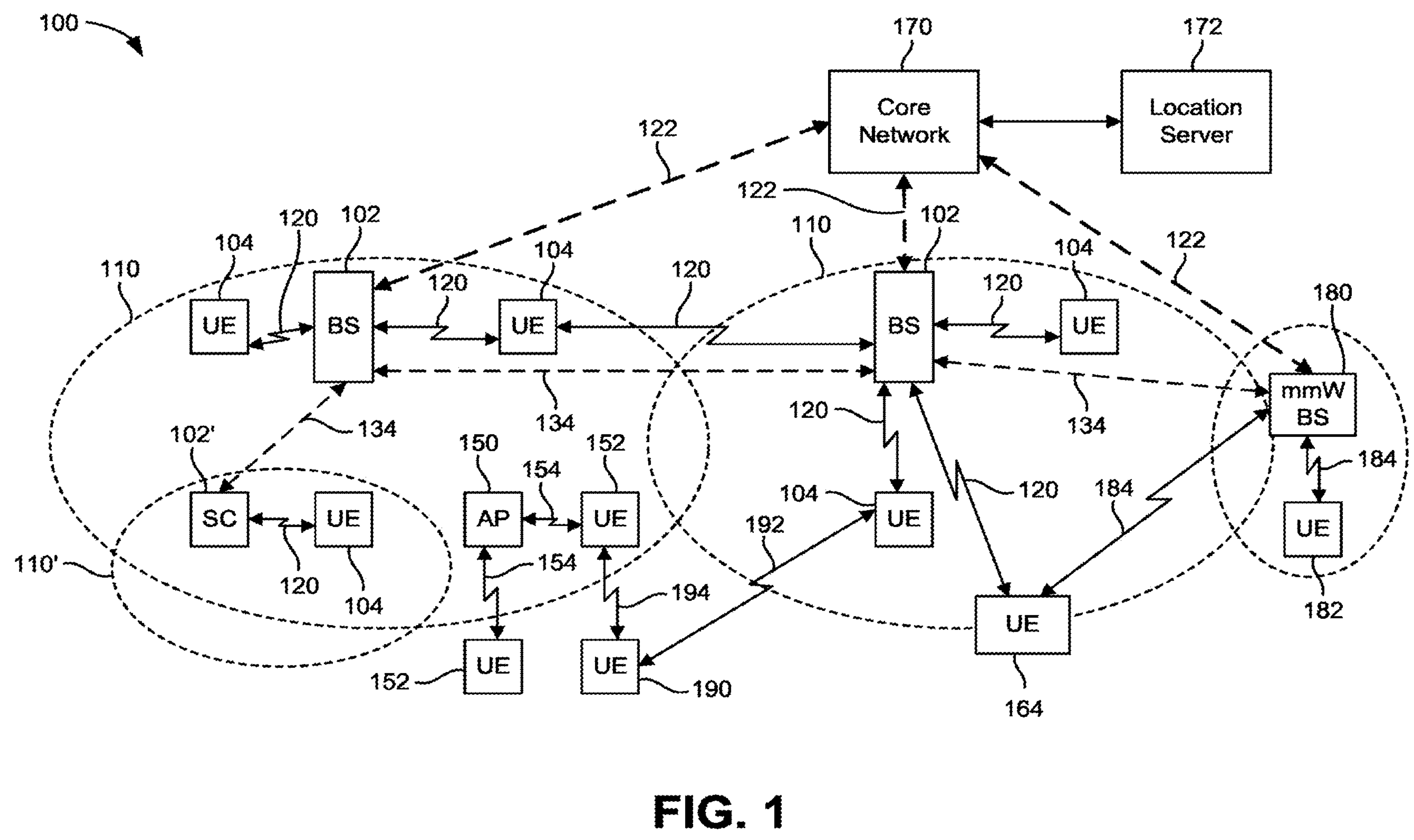
FIG. 1 illustrates an example wireless communications system, in accordance with some aspects of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Aspects of the instant disclosure relate to features for improving mobile device (e.g., user equipment (UE)) location estimation. As used herein, a location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other description of a location. A location estimate may further be defined relative to some other known location or defined in absolute terms (e.g., using latitude, longitude, and/or altitude). A location estimate may include an expected error or uncertainty (e.g., by including an area or volume within which the location is expected to be included with some specified or default level of confidence).

Systems, apparatuses, processes (also referred to as methods), and computer-readable media (collectively referred to herein as systems and techniques) are described herein for improved mobile device (e.g., UE) positioning using feedback (feedback messages) provided a location server, such as a Location Management Function (LMF). As described in more detail below, the systems and techniques can utilize feedback provided by the LMF in order to adjust location measurement reporting, e.g., by a UE, and/or base station (e.g., gNodeB (gNB)), to improve location/positioning functions performed by the LMF.

In some aspects, LMF feedback messaging is based on location measurements received by the LMF from the UE and/or gNB. By way of example, location measurements can include, but are not limited to, metrics such as a time-difference of arrival (TDOA), a round-trip-time (RTT), an angle-of-arrival (AoA), and/or an angle of departure (AOD), etc. The quality of various location measurements can be assessed by the LMF to determine how reporting adjustments can be adjusted to improve positioning accuracy and/or efficiency. Feedback provided by the LMF to the UE and/or gNB can then be issued to implement reporting adjustments. In some aspects, the LMF feedback provided to the UE/gNB can be based on quality metrics, such as signal-to-noise ratio (SNR) and/or non-line of sight (NLOS) metrics for location measurements computed from various positioning signal (e.g., positioning reference signal (PRS) or sounding reference signal (SRS)) resources. As discussed in further detail below, statistical analysis, such as the use of random sampling consensus (RANSAC) techniques, can be used to identify instances when location measurement reporting is excessive, when different location measurements should be reported, when location measurement priorities should be changed, and/or when location measurements should be augmented with additional information.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
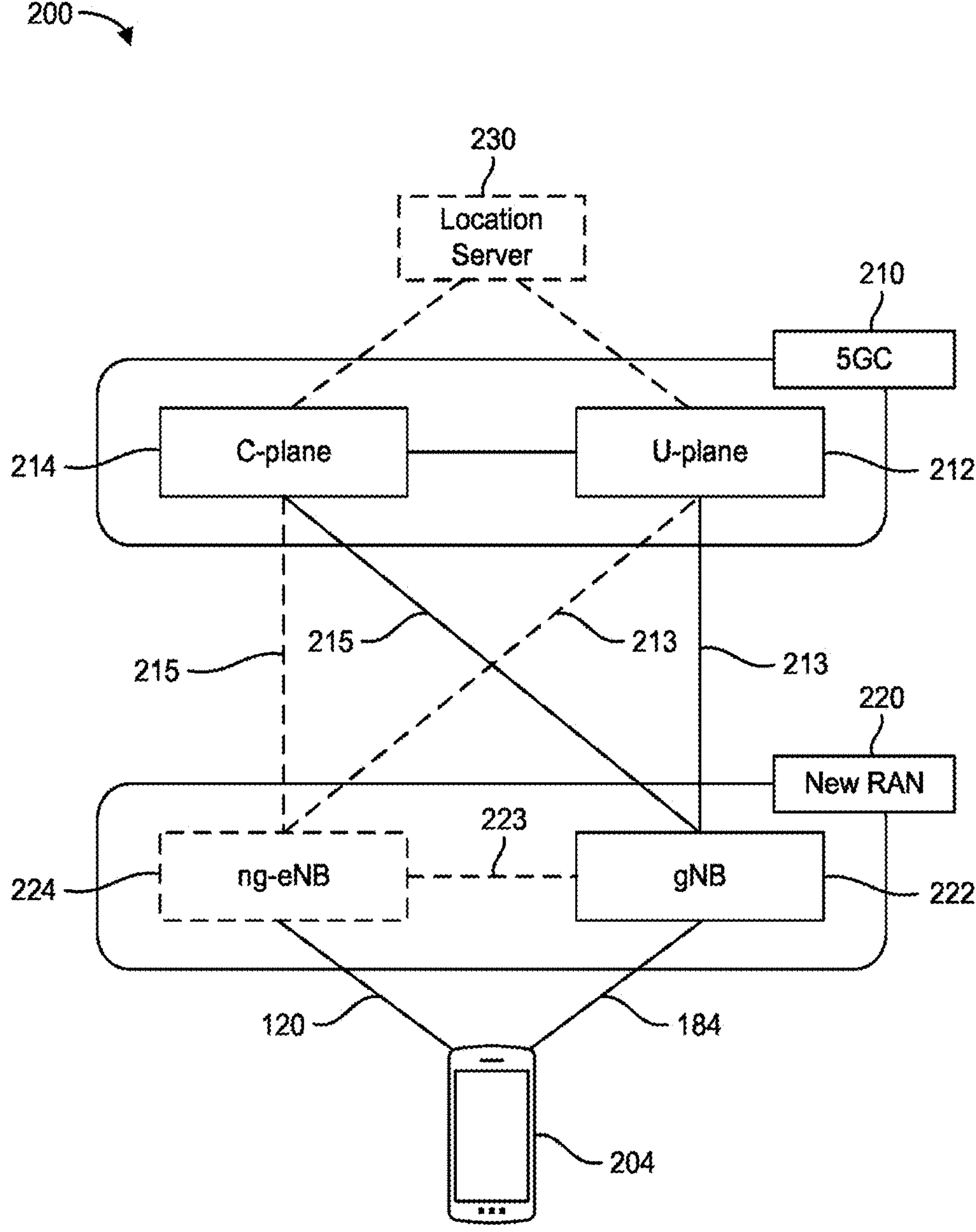
FIGS. 2A and 2B illustrate example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
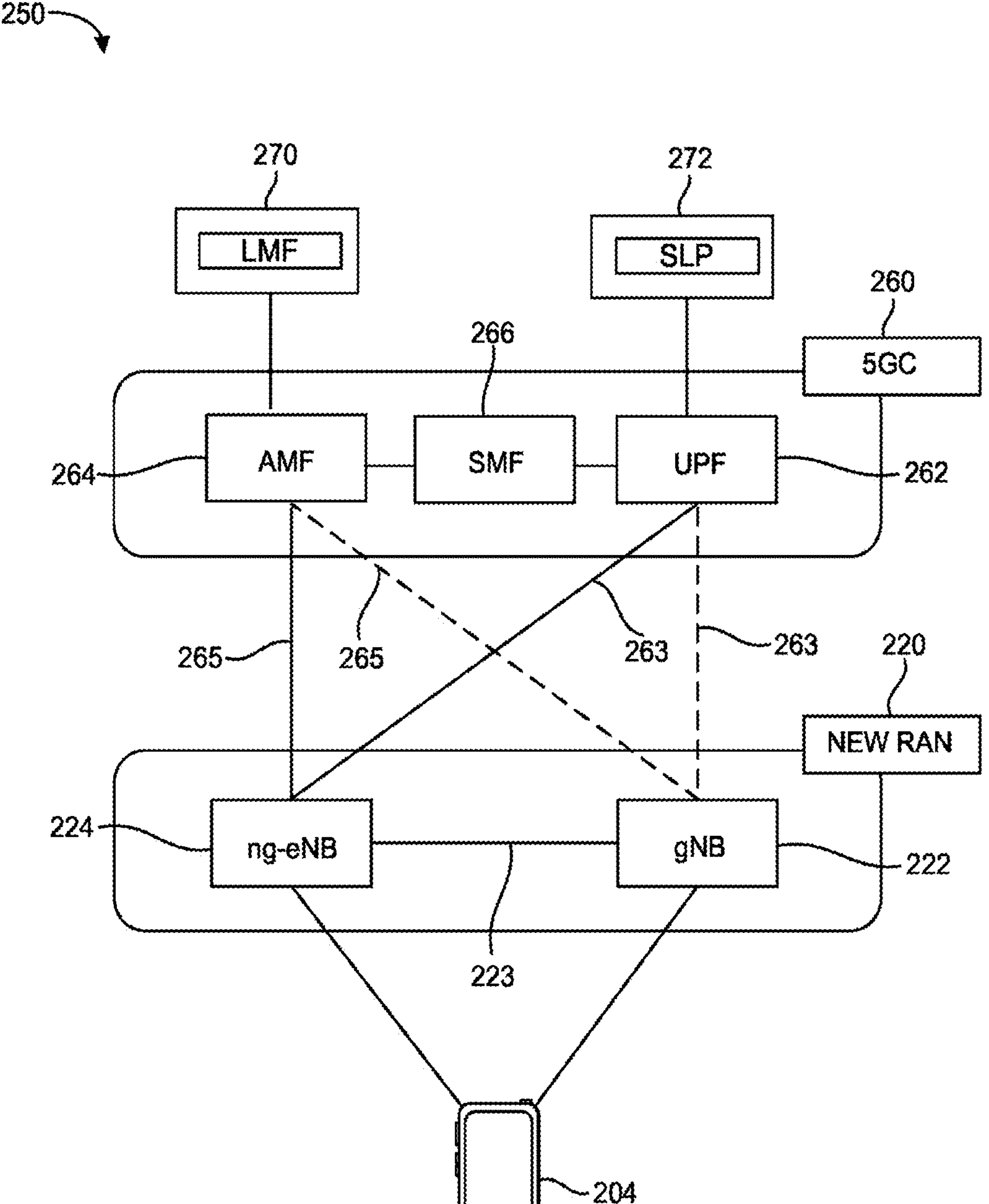

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and/or security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

In some aspects, location and positioning functions can be aided by a Location Management Function (LMF) 270 that is configured for communication with the 5GC 260, e.g., to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN

220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a base station, such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

As discussed herein, NR supports a number of cellular network-based positioning technologies, including downlink-based, uplink-based, and downlink-and-uplink-based positioning methods. For example, the LMF 270 can enable positioning based on location measurements computed for various positioning signal (PRS or SRS) resources. As used herein, "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (e.g., identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu}\cdot\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

In some cases, a PRS resource ID in a PRS resource set is associated with a single beam (and/or beam ID) transmitted from a single TRP (where a TRP may transmit one or more beams). For example, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer" or "layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb size. The Point A parameter takes the value of the parameter ARFCN-ValueNR (where "ARFCN" stands for "absolute radio-frequency channel number") and is an identifier and/or code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Downlink-based location measurements can include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., LMF 270) can estimate the UE's location. For DL-AoD positioning, a base station (gNB 222) measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT or multi RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements.

Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

To assist positioning operations, a location server (e.g., location server 230, LMF 270, or other location server) may provide assistance data to the UE. For example, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

For multi-RTT location measurements, the LMF 270 can initiate a procedure whereby multiple TRPs (not illustrated) and a UE perform the gNB Rx-Tx and UE Rx-Tx measurements, respectively. For example, the gNB 222 and UE 204 can transmit a downlink positioning reference signal (DL-PRS) and uplink sounding reference signal (UL-SRS), respectively, whereby the gNB 222 configures UL-SRS to the UE 204 e.g., using the radio resource control (RRC) protocol. In turn, the LMF 270 can provide the DL-PRS configuration to the UE 204. Resulting location measurements are reported to the LMF 270 by the UE 204 and/or gNB 222 to perform location estimation for the UE 204.

For DL-AoD, the UE 204 can provide DL-PRS beam Received Signal Received Power (RSRP) measurements to the LMF 270, whereas the gNB 222 can provide the beam azimuth and elevation angle information. When using an UL AoA positioning method, the position of UE 204 is estimated based on UL SRS AoA measurements taken at different TRPs (not illustrated). For example, TRPs can report AoA measurements directly to LMF 270. Using angle information (e.g., AoD or AoA) together TRP co-coordinate information and beam configuration details, the LMF 270 can estimate a location of UE 204.

Figure 3:
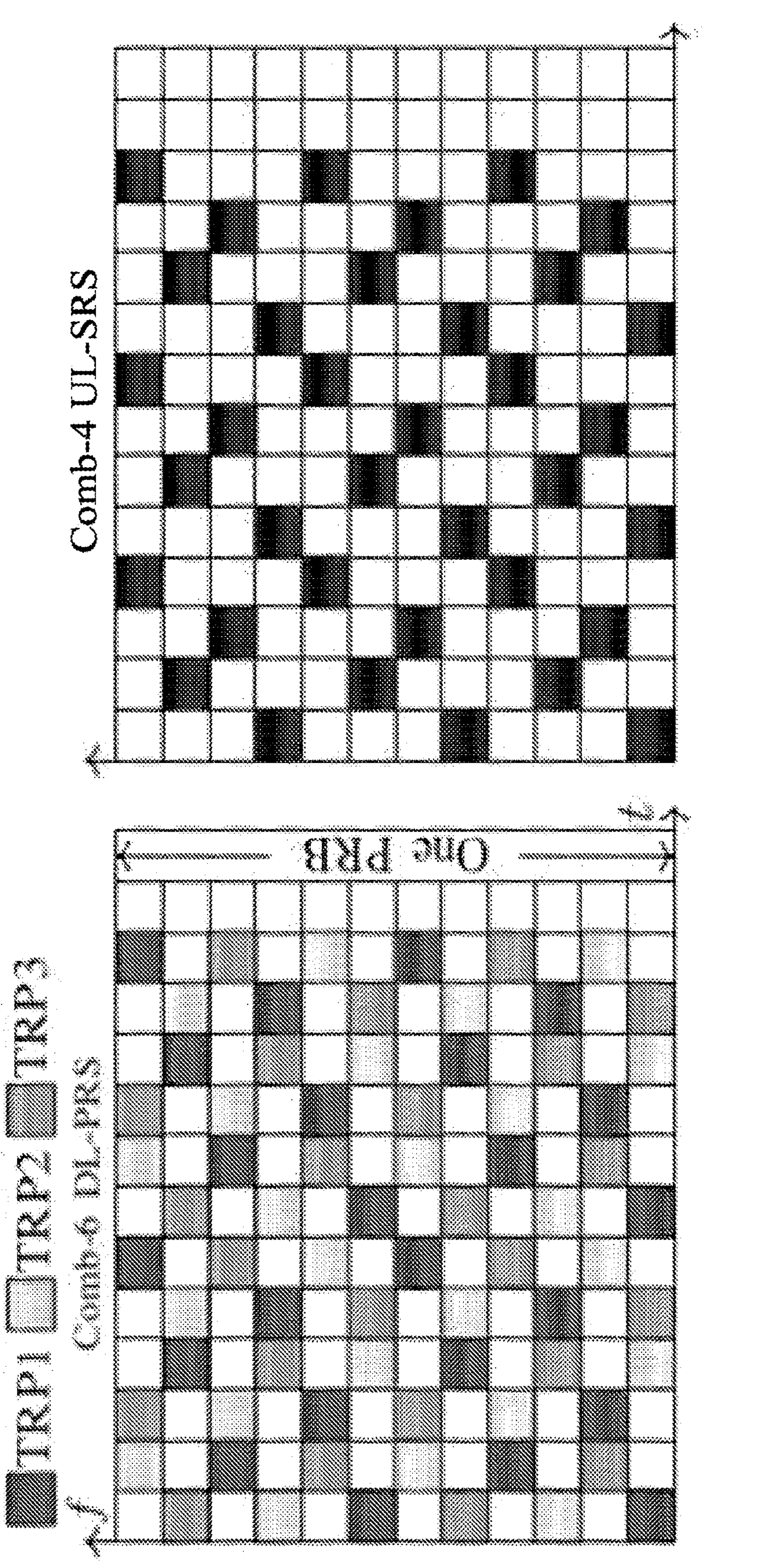
FIG. 3 illustrates example configurations of reference signals that are used to facilitate mobile device positioning, in accordance with some aspects of the present disclosure.

FIG. 3 illustrates example configurations of NR positioning reference signals. As illustrated, the DL-PRS is arranged in a comb-6 pattern, e.g., with three TRPs, whereas the example UL-SRS, from a UE, has a comb-4 pattern.

Although NR supports the use of multiple reference signals for performing UE positioning, for example through the receipt of TDOA, RTT, AoA, and AoD measurements from either the UE or the gNB, conventional configurations do not provide the ability for measurement reporting to be adjusted or otherwise modified by the LMF. For example, in conventional setups, the LMF does not provide feedback to the UE/gNB regarding poor measurements for which reporting can be adjusted to improve LMF positioning accuracy. Consequently, there are various scenarios in which location measurement reporting is sub-optimal. For example, in some instances, the UE may engage in over-reporting by providing more location measurements to the LMF than is necessary to ascertain the UE's position, resulting in unnecessary UE power consumption. In such cases, it can be beneficial to reduce location measurement reporting frequency and/or reporting for specific resource types. In other instances, some PRS or SRS resources may experience poor conditions, e.g., having poor signal-to-nose ratio (SNR) non-line of sight (NLOS) measurements, and/or distance traveled metrics. Additionally, in some instances, TRP positioning relative to the UE, e.g., an out-of-view TRP, can adversely affect location measurement quality. In such cases, it can be beneficial for the LMF to receive location measurements from different TRPs, for different resources, and/or to receive additional data for one or more location measurements.

Aspects of the disclosed technology address the foregoing limitations by providing systems, apparatuses, processes, and computer-readable media for providing a feedback message from the LMF to the UE and/or gNB that includes information indicating how location measurement reporting can be improved by the receiving device. In some approaches, the feedback message can contain information indicating recommended location measurement reporting adjustments. In other approaches, the feedback message can contain information to configure location reporting. As such, depending on the desired implementation, feedback messages can include instructions/commands issued by the location server, or can include recommendations that may be implemented or disregarded at the discretion of the receiving device. As discussed in further detail below, the feedback message can include information requesting that the receiving UE and/or gNB to pause reporting on specifically identified resources, for example, for a predetermined number of instances or a predetermined time-period. In some approaches, the feedback message can include information recommending a change in periodicity of location measurement reporting. Additionally, the feedback message can include information requesting that the UE and/or gNB to provide additional information to the LMF for specifically identified location measurement types, resources, and/or to change a priority for PRS resource reporting. By way of example, the feedback message can be used to effectively request the transmission of new PRS/SRS measurements that include either new measurements for the same PRS/SRS resources, or additional/different measurements that had not be previously (or recently computed) by the UE and/or gNB.

Figure 4A:
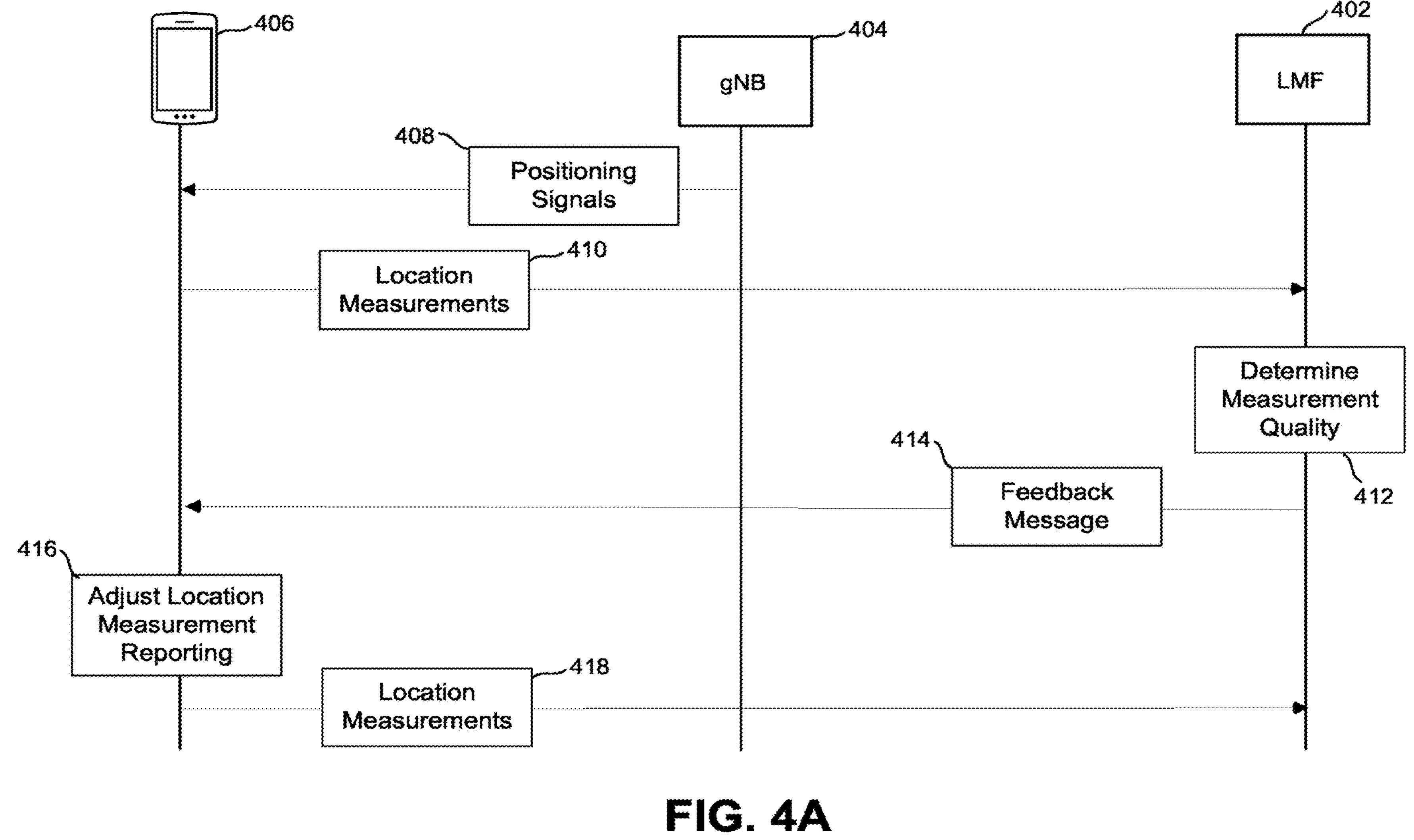
FIG. 4A illustrates an example communication diagram illustrating how location server feedback can be used to adjust location measurement reporting by a mobile device, according to some aspects of the disclosed technology.

The disclosure now turns to FIG. 4A which illustrates a simplified communication diagram illustrating an example of how feedback from a location server (LMF 402) can be used to adjust location measurement reporting by a mobile device (UE 406). Initially, one or more positioning signals 408 are transmitted from a base station (gNB 404) to the UE 406. Positioning signals 408 can include a PRS (e.g., DL-PRS) reference signal from which UE 406 can compute various location measurements. The PRS can be transmitted from gNB 404 to UE 406 in beams (e.g., a PRS resource), where a full set of PRS beams transmitted from a TRP on the same frequency is referred to as a PRS resource set. Resource elements in the positioning signals 408 can be used by UE 406 to calculate various location measurements including TDOA, RTT, and/or AoA measurements that are then communicated to the LMF 402 (410). Additionally, in some aspects, the beam structure of the PRS can improve coverage especially for mm-wave deployments and allow for AoD estimation, for example, where the UE 406 can measure a LD PRS Received Signal Time Difference (RSTD) per-beam, and report the measured RSTD including the DL PRS Resource identifier (beam id) to the LMF 402.

Location measurements received by the LMF 402 can be used to determine if reporting can be adjusted to improve UE reporting efficiency and/or position accuracy. In some aspects, the LMF 402 can compute statistical measures of location measurement quality, for example, by determining SNR and/or NLOS conditions for the received measurements. By way of example, NLOS conditions can be determined using algorithms such as RANSAC to determine how position accuracy for location determinations of the UE 406 are affected by using different subsets of reported location measurements (412). For example, the SNR and/or NLOS metrics may be used to identify what location measurements may be unnecessary, identify different location measurements (or measurement priorities) that may be more useful for position estimation and/or identify those for which more reporting information is desired. In some aspects, other metrics such as a distance traveled and/or in-view status of a corresponding TRP may be used to assess the quality of one or more reported location measurements.

In some instances, the LMF 402 may determine that the UE 406 location reporting is excessive. For example, location reporting may be determined to be excessive if the number of reported measurements and/or measurement reporting frequency exceeds a predetermined threshold. In other approaches, location reporting may be determined to be excessive if the LMF 402 determines that adequate UE position accuracy can be achieved using a subset of the reported location measurements, and that the UE 406 can reduce a frequency or total number of reported location measurements. Reductions in measurement reporting can be particularly beneficial when measurement reporting is suppressed at the UE 406, where greater benefits may be realized by reducing power consumption and computational loads. In such instances, a feedback message (414) provided from the LMF 402 to the UE 406 can include information for requesting the reduction or suppression of location measurement reporting by the UE 406. Depending on the desired implementation, the feedback message 414 may specify a predetermined timeout period, after which normal location measurement reporting by the UE 406 can be resumed. Alternatively, the feedback message 414 may specify a predetermined number of measurements, or measurement types, for which reporting is to be suppressed by the UE 406. By way of example, the feedback message 414 can include identifier data that identifies one or more PRS resources for which reporting is to be suppressed.

In some implementations, a timeout period specified for location measurement reporting, or for reporting of specific PRS resources, can be extended before it expires. For example, a reporting suppression period may be extended if it is determined by the LMF 402 that the UE 406 is persisting in a location where certain location measurements are of a low-quality, or otherwise superfluous to location estimation accuracy. In some aspects, reporting time-out periods can be automatically adjusted based on detected changes to a location of the UE 406, such as based on a velocity profile of UE, and/or its position (e.g., in-view or out-of-view status) with respect to one or more TRPs.

In some instances, the LMF 402 may determine that additional measurement location metrics, e.g., for specific PRS resources can improve UE location estimation. In such instances, the feedback message 414 may specify additional information (e.g., Rx-Tx time difference information for specific resources, Position State Information (PSI), and/or additional path reports, etc.) that may improve UE location estimation.

In some instances, the LMF 402 may determine that changes to a priority of location measurement reporting for specific PRS resources may improve UE location estimation. In some network implementations, the PRS resource priority order is set by defaults indicated by singling in the assistance data. However, if the LMF 402 determines that location measurements computed for a different PRS resource order can improve UE position estimation, then the feedback message 414 may indicated the desired resource order.

Once the LMF feedback message 414 has been received by the UE 406, location measurement reporting can be adjusted (at operation 416) accordingly. For example, in instances where location measurement reporting is suppressed, the UE 406 may be configured to either avoid transmission of the corresponding location measurements or to discard location measurement computation altogether. As such, subsequent location measurements 418 (e.g., a second set of location metrics) reported by the UE 406 to LMF 402 can be provided in the manner indicated by the feedback message 414.

Figure 4B:
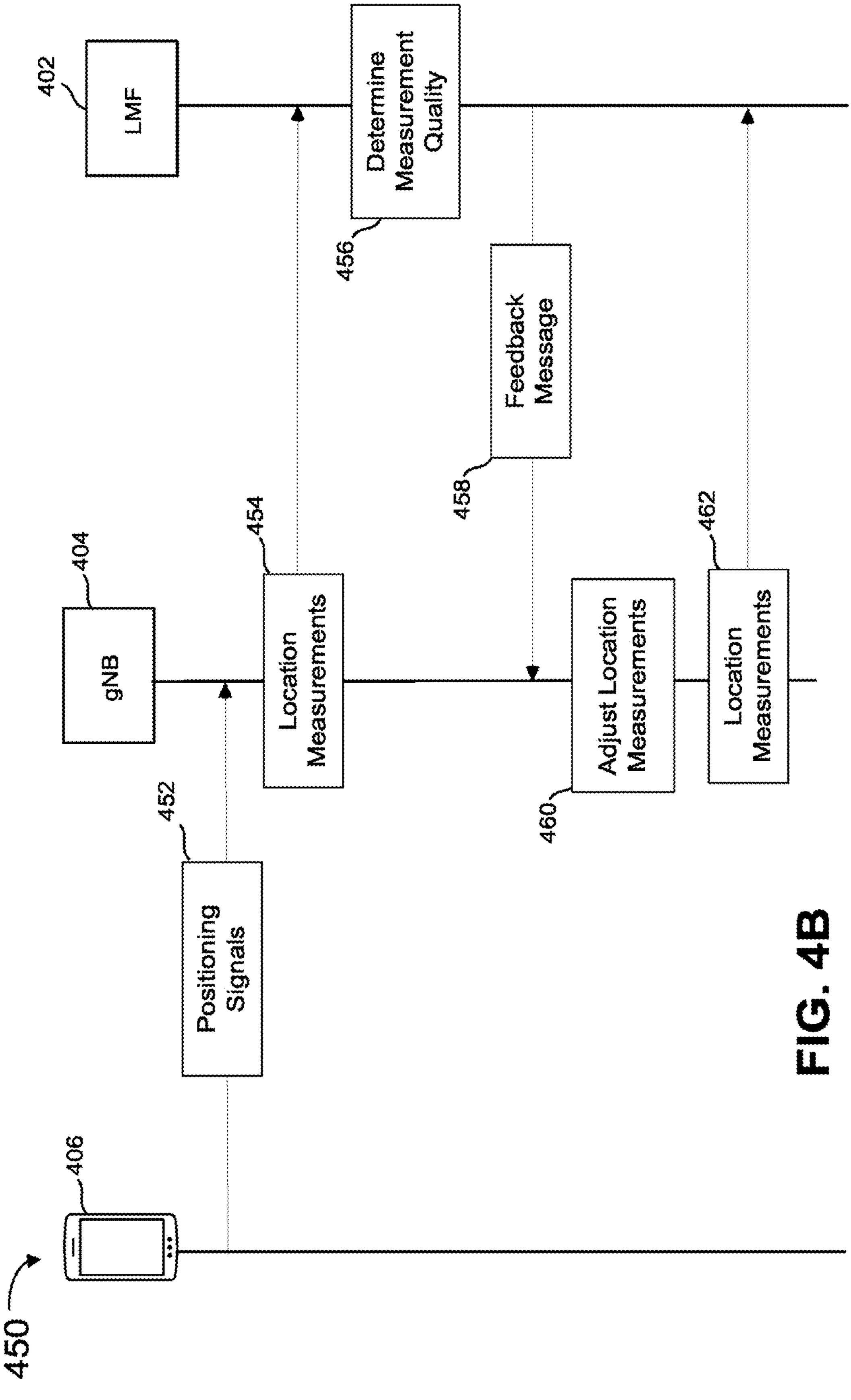
FIG. 4B illustrates an example communication diagram illustrating how location server feedback can be used to adjust location measurement reporting by a base station, according to some aspects of the present disclosure.

The disclosure now turns to FIG. 4B which illustrates a simplified communication diagram illustrating an example of how feedback from a location server (LMF 402) can be used to adjust location measurement reporting at a base station (gNB 404).

Initially, one or more uplink positioning signals 452 are transmitted from a mobile device (UE 406) to the gNB 404. Positioning signals 452 can include a SRS (e.g., UL-SRS) reference signal from which gNB 404 can compute various location measurements (454). As discussed in further detail below with respect to FIGS. 5A and 5B, the computation of location measurements by the gNB 404 can be performed by various TRPs (not illustrated) that receive the reference signals. In practice, the SRS signals can be transmitted from UE 406 to gNB 404 in beams (e.g., SRS resources). Like the DL PRS, the SRS resources for positioning can be transmitted on a single antenna port and placed to begin on any symbol in the NR uplink slot. Resource elements in the positioning signals 452 can be used by gNB 404 to calculate various location measurements including TDOA, AoA (e.g., based on A-AoA and Z-AoA), and/or RTT measurements that are then communicated to the LMF 402 (454).

Location measurements received by the LMF 402 are then used to determine if reporting should be adjusted to improve gNB reporting efficiency and/or UE location estimation accuracy (456). In some aspects, the LMF 402 can compute statistical measures of location measurement quality, for example, by determining SNR and/or NLOS conditions for the received measurements. As discussed above, NLOS conditions or metrics can be determined using algorithms such as RANSAC to determine how position accuracy for location determinations of the UE 406 are affected by the use of different subsets of reported location measurements (462). Additionally, other metrics, such as distance traveled metrics, and/or an in-view (or out-of-view) status of one or more TRPs may be used.

In some instances, the LMF 402 may determine that the gNB 404 location reporting is excessive. For example, the LMF 402 may determine that adequate UE position accuracy may be achieved using a subset of the reported location measurements, and that the gNB 404 can reduce a frequency (e.g., by increasing a reporting periodicity) or total number of reported location measurements, thereby reducing gNB power consumption and computational loads. In such instances, a feedback message (458) provided from the LMF 402 to the gNB 404 can include information requesting a reduction or suppression of location measurement reporting by the gNB 404. For example, the feedback message 458 can specify that location measurements be suppressed for specific TRPs and/or for specifically indicated resources.

Depending on the desired implementation, the feedback message 458 can specify a predetermined timeout period, after which normal location measurement reporting by the gNB 404 (or indicated TRPs) can be resumed. Alternatively, the feedback message 458 may specify a predetermined number of measurements, or measurement types, for which reporting is to be suppressed. In some implementations, the feedback message 458 can include identifier data that indicates one or more SRS resources and/or TRPs for which measurement reporting is to be suppressed.

In some implementations, a timeout period specified for location measurement reporting, or for reporting of specific SRS resources, can be extended before it expires. For example, a reporting suppression period may be extended if it is determined by the LMF 402 that the UE 406 is persisting in a location where resulting location measurements are of a low-quality, or otherwise not useful for improved location estimation accuracy. In some aspects, reporting time-out periods can be automatically adjusted based on detected changes to a location of the UE 406, such as based on a velocity profile of the UE 406, and/or its position (e.g., in-view or out-of-view status) with respect to one or more TRPs.

In some instances, the LMF 402 may determine that additional measurement location metrics, e.g., for specific SRS resources, may improve UE location estimation. In such instances, the feedback message 458 may specify additional information (e.g., Rx-Tx time difference information for specific resources, Position State Information (PSI), and/or additional path reports, etc.) that may improve UE location estimation. In some approaches, additional information and/or measurement metrics can include a request for one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof. As discussed above, feedback message requests for can be used to effectively request the transmission of new PRS/SRS measurements that include either new measurements for the same PRS/SRS resources, or additional/different measurements that had not be previously (or recently computed) by the UE and/or gNB.

In some instances, the LMF 402 may determine that changes to a priority of location measurement reporting for certain SRS resources can improve UE location estimation. In some network implementations, the SRS resource priority order is set by defaults indicated by singling in the assistance data. However, if the LMF 402 determines that location measurements computed for a different PRS resource order can improve UE position estimation, then the feedback message 458 may indicated the desired resource order.

Once the LMF feedback message 414 has been received by the gNB 404, location measurement reporting can be adjusted (at operation 460) accordingly. For example, in instances where location measurement reporting is suppressed, the gNB 404 may be configured to either avoid transmission of the corresponding location measurements or to discard their computation altogether. As such, subsequent location measurements 462 (e.g., a second set of location metrics) reported by the gNB 404 to LMF 402 can be provided in the manner indicated by the feedback message 458.

By way of further example, the feedback message 458 can include information indicating a specific manner in which subsequent location metrics are to be reported by the UE 406/gNB 404. For example, the feedback message 458 can contain information indicating a number of requested location measurements from a particular TRP, a start time for location measurement modification, an end time for location measurement modification, a duration of location measurement modification, how to transmit one or more additional location measurements, e.g., using a specific protocol, such as LPP, or a particular protocol layer, such as L1/L2, or any combination thereof.

Depending on the desired implementation, location measurements can be communicated to the LMF 402 using various protocol layers, such as by using a low-layer protocol. By way of example, location measurements can be transmitted using a Layer 1 (L1) protocol, such as a Downlink Control Information (DCI) message, a Layer 2 (L2) protocol, such as using a MAC Control Element (MAC CE) message, and/or a Layer 3 protocol, such as using a Radio Resource Control (RRC) message, or the like. Similarly, feedback messages can be communicated by the LMF 402 (e.g., to the UE 406 and/or gNB 404) using various protocol layers. For example, feedback messages may be transmitted using a Layer 1 (L1) protocol, such as a Downlink Control Information (DCI) message, a Layer 2 (L2) protocol, such as using a MAC Control Element (MAC CE) message, and/or a Layer 3 protocol, such as using a Radio Resource Control (RRC) message, or the like.

Figure 5A:
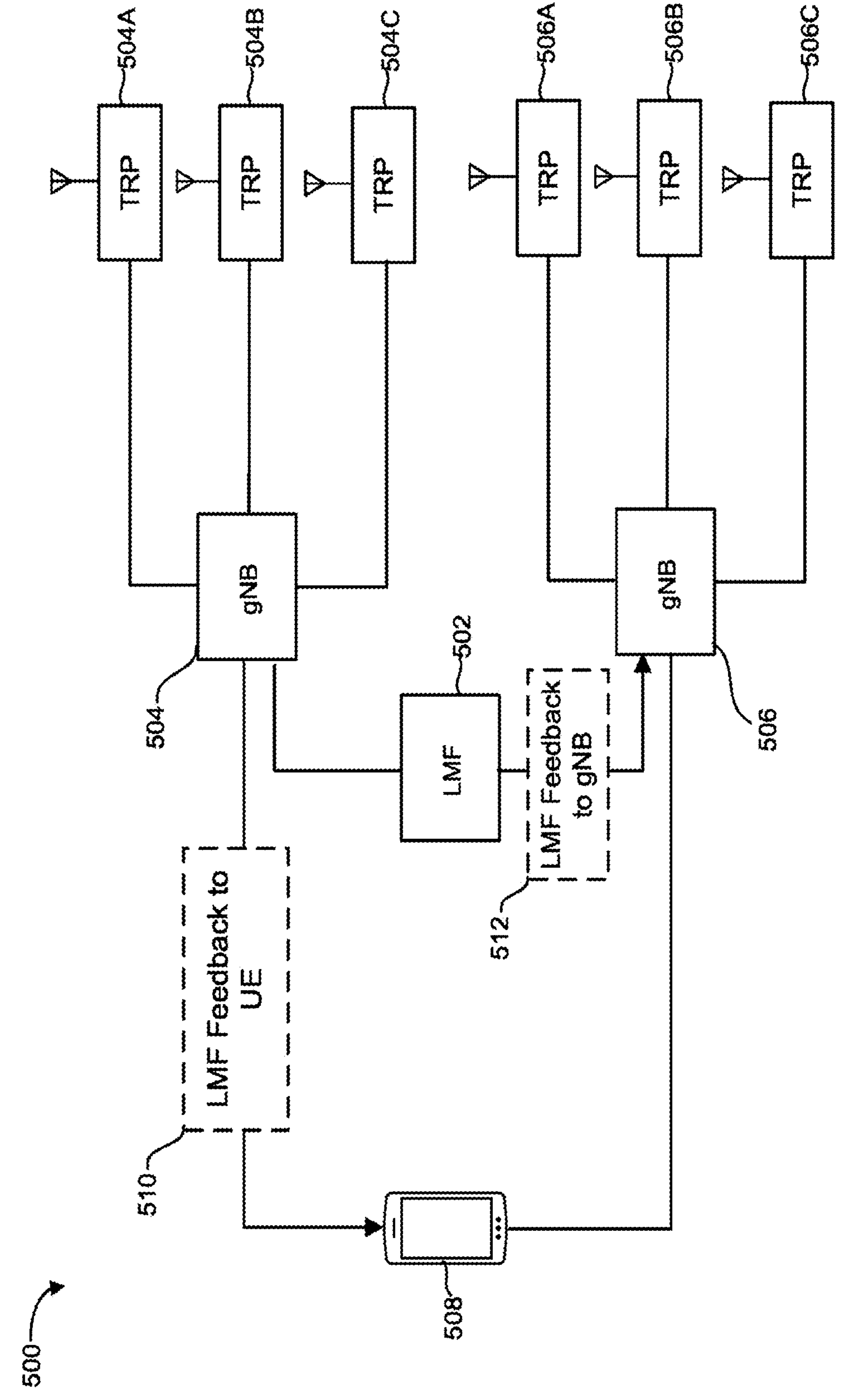
FIG. 5A illustrates an example network implementation in which an LMF feedback message is used to adjust location measurement reporting by a mobile device, according to some aspects of the disclosed technology.
Figure 5B:
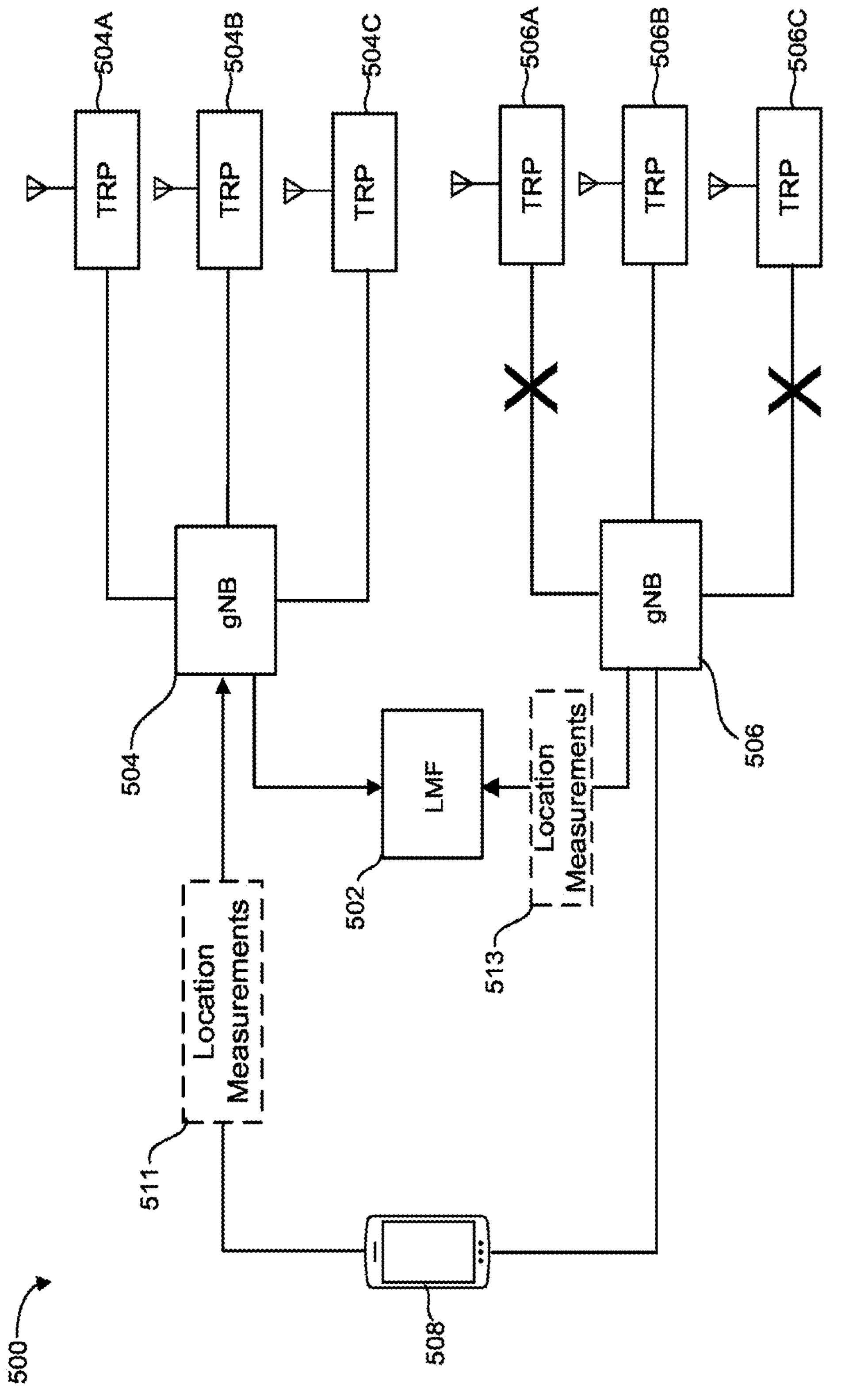
FIG. 5B illustrates an example network implementation in which an LMF feedback message is used to adjust transmission of positioning signals from a gNB to a mobile device, according to some aspects of the present disclosure.

FIGS. 5A and 5B illustrate an example network 500 in which LMF feedback messaging is used to adjust location measurement reporting by a mobile device and a gNB, according to some aspects of the disclosed technology. In the example of simplified network 500, a location server (i.e., LMF 502) is implemented to perform location estimation for a mobile-device (UE) 508 that is in communication with base stations (gNBs) 504, 506. Each of gNBs 504, 506 are associated with multiple TRPs, i.e., TRPs 504A, 504B, 504C, and 506A, 506B, 506C, respectively. It is understood that a greater number of gNBs and/or TRPs may be implemented, without departing from the scope of the disclosed technology.

In practice, LMF 502 is configured to provide feedback messaging to gNBs (504, 506) and/or UE 508, for example, to adjust or manage location reporting at either device. For example, LMF 502 can transmit a feedback message 510 to UE 508 based on one or more location measurements reported to LMF 502 based on variously received PRS resources. LMF 502 can also transmit a feedback message to one or more of the gNBs 504, 506 based on one or more location measurements reported to LMF 502 based on various SRS resources received by gNBs 504, 506. As discussed above, location measurements reported by UE 508 and/or gNBs 504, 506 can include TDOA, TRR, AOA, and/or AOD measurements based on received PRS/SRS resources.

In some aspects, the LMF 502 feedback messaging provided to the UE 508 and/or gNBs 504, 506 can be based on quality metrics, such as signal-to-noise ratio (SNR) and/or non-line of sight (NLOS) metrics for the received location measurements. In some aspects, the LMF 502 can assess location measurement quality and/or importance using statistical approaches, such as by using a random sampling consensus (RANSAC) technique to identify location measurement outliers. Based on the quality of the received location measurements, the LMF 502 provides a feedback message 510 to UE 508, and a feedback message 512 to gNB 506. In some implementations, other quality metrics may be used. For example, distance traveled metrics, and/or an in-view (or out-of-view) status of one or more TRPs may be used to determine location measurement quality.

The LMF feedback messages (510, 512) can be configured to cause adjustments to location measurement reporting by the receiving devices, e.g., UE 508 and gNB 506 respectively. In some implementations, the LMF 502 may determine that additional measurement location metrics, e.g., for specific PRS/SRS resources can improve UE location estimation. In such instances, the feedback messages 510, 512 may specify additional information, such as, Rx-Tx time difference information for specific resources, and/or additional path reports, etc., that may improve location estimates for the UE 508. Additionally, in some aspects, additionally requested information can include one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

In some implementations, the LMF 502 may determine that changes to a priority of location measurement reporting for specific PRS/SRS resources may improve location estimation for the UE 508. As discussed above, the PRS/SRS resource priority order can be set by defaults indicated by singling in the assistance data. However, if the LMF 502 determines that location measurements computed for a different PRS/SRS resource order can improve UE position estimation, then the feedback messages 510, 512 may be configured to indicate the desired resource priority order.

Furthermore, as discussed above, the LMF 502 feedback messages (510, 512) can be include information requesting a reduction in a number of reported location measurements. Reductions in location measurement reporting counts (or frequencies) may be desired in instances where a number of location measurements sent from the reporting device (UE 508 or gNBs 504, 506) is in excess of a predetermined threshold, and/or in excess of a number of measurements required to perform UE location estimation. Location measurement suppression can be configured to persist for a predetermined time-period, and/or location measurement reporting may be suspended for a predetermined number of location measurement instances.

In other implementations, location measurement suppression may obtain for specific measurement types, for particularly identified resources, and/or for measurements associated with specific TRPs. By way of example, LMF feedback 512 provided to the gNB 506 may contain identifier data indicating specific resources or TRPs for which location measurement reporting should be suppressed. As illustrated in the example of FIG. 5B, feedback message 512 can be configured to suppress location measurement reporting (of location measurements 513) from specific TRPs associated with gNB 506 (e.g., TRPs 506A, and 506B). As also illustrated in the example of FIG. 5B, the feedback 512 can also be configured to suppress location measurement reporting (of location measurements 511) from the UE 508. As such, feedback messages can include information indicating a specific manner in which subsequent location metrics are to be reported by the UE/gNB. For example, the feedback message can contain information indicating a number of requested location measurements from a particular TRP, a start time for location measurement modification, an end time for location measurement modification, a duration of location measurement modification, how to transmit one or more additional location measurements, e.g., using a specific protocol, such as LPP, or a particular protocol layer, such as L1/L2, or any combination thereof.

Figure 6:
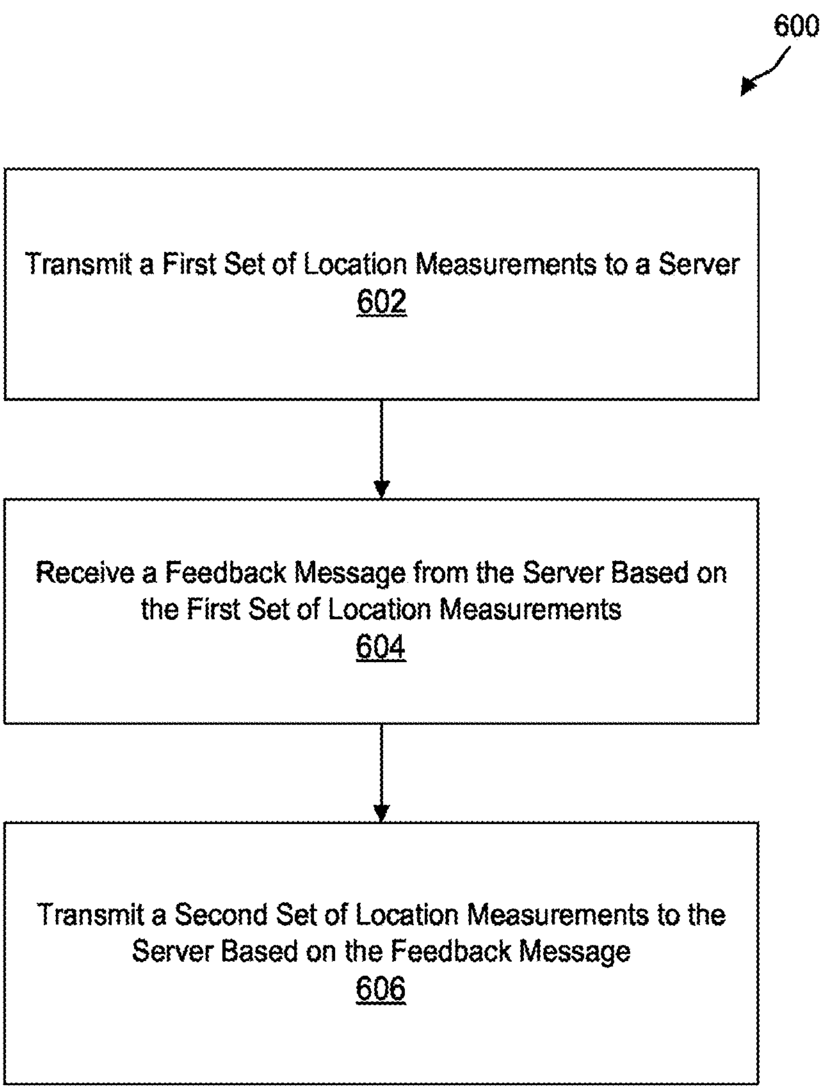
FIG. 6 illustrates a flow diagram of an example process for adjusting location measurement reporting by a mobile device and/or a base station, according to some aspects of the present disclosure.

FIG. 6 illustrates a flow diagram of an example process 600 for adjusting location measurement reporting by a mobile device (e.g., a UE) and/or a base station (gNB), according to some aspects of the present disclosure. Process 600 can be implemented at different nodes in a NR network implementation, such as at a UE and/or a gNB, as discussed above with respect to FIGS. 5A and 5B.

At block 602, the process 600 includes transmitting a first set of location measurements to a server, such as a location server (e.g., the location server 230, which can include an LMF, such as the LMF 270). Depending on the device implementing the process, the location measurements may be based on PRS or SRS resources. For example, if implemented on a UE, the location measurements may include one or more TDOA, RTT, AOA, and/or AOD metrics computed based on received PRS resources. If implemented at a base station (e.g., on a gNB), the location measurements may include TDOA, RTT, and/or AOA measurements based on received SRS resources.

At block 604, the process 600 includes receiving a feedback message from the server based on the first set of location measurements. For example, once received at the location server (e.g., the LMF 270), location measurement quality and/or importance can be assessed using statistical approaches, such as by using a random sampling consensus (RANSAC) technique to identify location measurement outliers. These quality metrics can then be used to generate one or more feedback messages that are provided to and received by the UE and/or gNB (block 604). In some cases, the feedback message is based on a number of the first set of location measurements exceeding a predetermined threshold. In some aspects, the feedback message is based on one or more of a Signal to Noise Ratio (SNR) metric, a Non-line of Sight (NLOS) metric for the first set of location measurements, a distance traveled metric, and/or an in-view (or out-of-view) status of one or more TRPs, or a combination thereof.

At block 606, the process 600 includes transmitting a second set of location measurements to the server based on the feedback message. For example, as discussed above, the feedback messages including information requesting that the receiving device (e.g., the UE and/or the gNB) adjust or measurement reporting in the specified manner (block 606). As discussed above, the feedback messages can be implemented as requests or suggestions, for example, which can be applied or discarded at the discretion of the receiving device. Alternatively, the feedback messages can include instructions/configurations that dictate future feedback measurement reporting.

By way of example, the feedback message can include information requesting a reduction in one or more of the second set of location measurements for a predetermined time, such as in instances where a number of the first set of location measurements exceeded a predetermined threshold. In other aspects, the feedback message can be configured to reduce transmission of a predetermined number of measurements in the second set of location measurements. In other aspects, the feedback message can be include a request to change one or more location measurements that are selected for reporting in the second set of location measurements. Additionally, the feedback message can include a request to change a priority order of location measurements being reported.

By way of example, the feedback message can include a request for transmission of additional information associated with one or more specified measurements selected from among the second set of location measurements. In one example, the feedback message can specify additional measurement information and/or different resources and/or resource priorities, on which the subsequently reported location measurements should be based. In some aspects, the feedback message includes identifier (ID) data identifying one or more resources associated with the PRS or the SRS, or a combination thereof.

In some aspects, the feedback messages can include information indicating a specific manner in which subsequent location metrics are to be reported by the UE/gNB. For example, the feedback message can contain information indicating a number of requested location measurements from a particular TRP, a start time for location measurement modification, an end time for location measurement modification, a duration of location measurement modification, how to transmit one or more additional location measurements, e.g., using a specific protocol, such as LPP, or a particular protocol layer, such as L1/L2, or any combination thereof.

As discussed above, location measurements can be transmitted from the UE/gNB using different protocol layers, such as by using a low-layer protocol. By way of example, location measurements can be transmitted using a Layer 1 (L1) protocol, such as a Downlink Control Information (DCI) message, a Layer 2 (L2) protocol, such as using a MAC Control Element (MAC CE) message, and/or a Layer 3 protocol, such as using a Radio Resource Control (RRC) message, or the like.

In some examples, the processes described herein (e.g., process 600 and/or other processes described herein) may be performed by a computing device or apparatus. In one example, the process 600 can be performed by a computing device or the computing system 800 shown in FIG. 8.

The computing device can include any suitable UE or device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes 600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the operations or steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

Process 600 illustrates a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
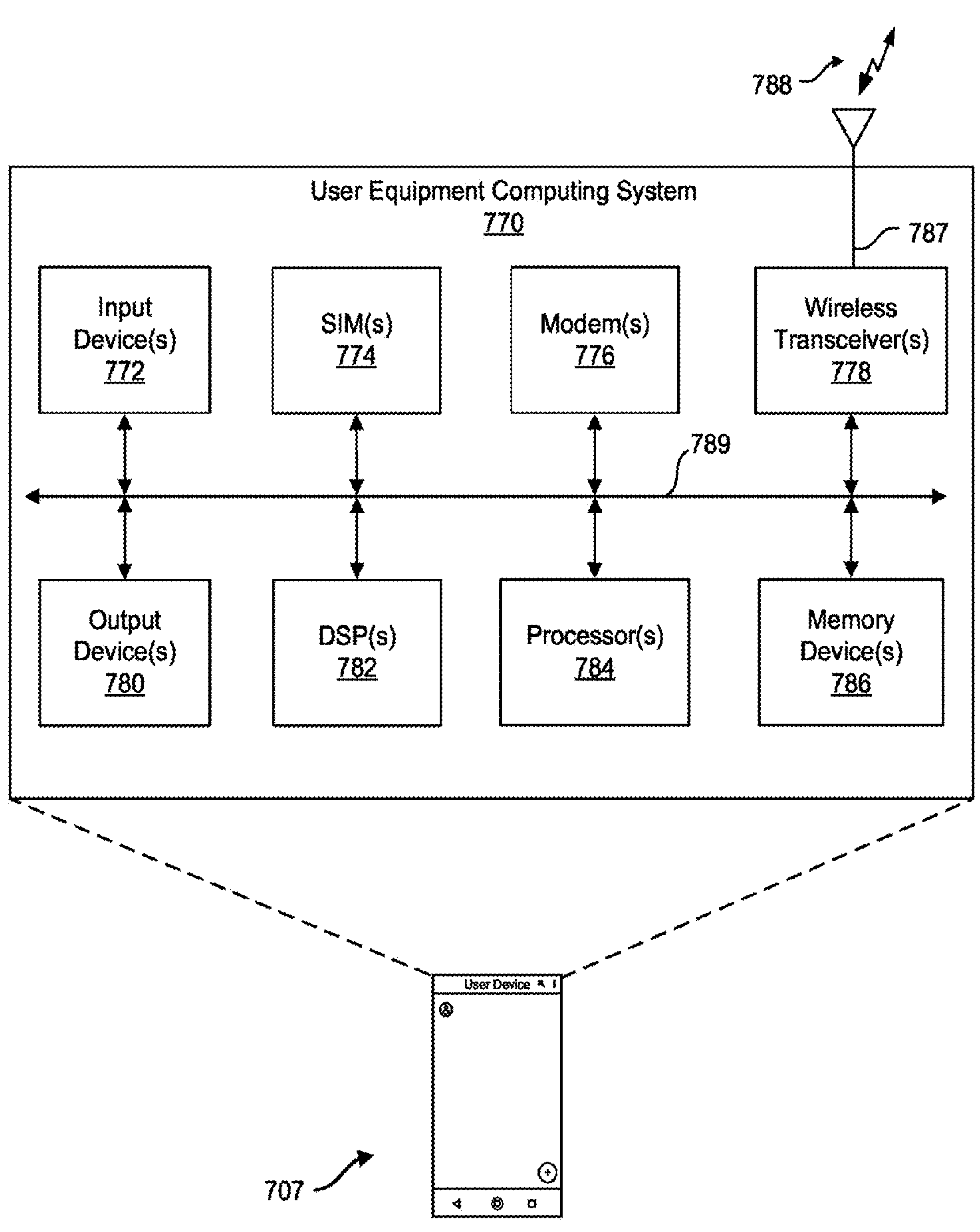
FIG. 7 illustrates an example block diagram of a computing system of a user equipment (UE), in accordance with some aspects of the present disclosure.

FIG. 7 illustrates an example of a computing system 770 of a user equipment (UE) 707. In some examples, the UE 707 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 770 includes software and hardware components that can be electrically coupled via a bus 789 (or may otherwise be in communication, as appropriate). For example, the computing system 770 includes one or more processors 784. The one or more processors 784 can include one or more CPUs, ASICs, FPGAs, APs, GPUs, VPUs, NSPs, microcontrollers, dedicated hardware, any combination thereof, and/or other processing device or system. The bus 789 can be used by the one or more processors 784 to communicate between cores and/or with the one or more memory devices 786.

The computing system 770 may also include one or more memory devices 786, one or more digital signal processors (DSPs) 782, one or more subscriber identity modules (SIMs) 874, one or more modems 776, one or more wireless transceivers 778, an antenna 787, one or more input devices 772 (e.g., a camera, a mouse, a keyboard, a touch sensitive screen, a touch pad, a keypad, a microphone, and/or the like), and one or more output devices 780 (e.g., a display, a speaker, a printer, and/or the like).

The one or more wireless transceivers 778 can transmit and receive wireless signals (e.g., signal 788) via antenna 787 to and from one or more other devices, such as one or more other UEs, network devices (e.g., base stations such as eNBs and/or gNBs, WiFi routers, etc.), cloud networks, and/or the like. As described herein, the one or more wireless transceivers 778 can include a combined transmitter/receiver, discrete transmitters, discrete receivers, or any combination thereof. In some examples, the computing system 770 can include multiple antennae. The wireless signal 788 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 778 may include an radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 788 into a baseband or intermediate frequency and can convert the RF signals to the digital domain.

In some cases, the computing system 770 can include a coding-decoding device (or CODEC) configured to encode and/or decode data transmitted and/or received using the one or more wireless transceivers 778. In some cases, the computing system 770 can include an encryption-decryption device or component configured to encrypt and/or decrypt data (e.g., according to the AES and/or DES standard) transmitted and/or received by the one or more wireless transceivers 778.

The one or more SIMs 874 can each securely store an International Mobile Subscriber Identity (IMSI) number and a related key assigned to the user of the UE 707. The IMSI and the key can be used to identify and authenticate the subscriber when accessing a network provided by a network service provider or operator associated with the one or more SIMs 774. The one or more modems 776 can modulate one or more signals to encode information for transmission using the one or more wireless transceivers 778. The one or more modems 776 can also demodulate signals received by the one or more wireless transceivers 778 in order to decode the transmitted information. In some examples, the one or more modems 776 can include a 4G (or LTE) modem, a 5G (or NR) modem, a Bluetooth™ modem, a modem configured for vehicle-to-everything (V2X) communications, and/or other types of modems. In some examples, the one or more modems 776 and the one or more wireless transceivers 778 can be used for communicating data for the one or more SIMs 874.

The computing system 770 can also include (and/or be in communication with) one or more non-transitory machine-readable storage media or storage devices (e.g., one or more memory devices 786), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 786 and executed by the one or more processor(s) 784 and/or the one or more DSPs 782. The computing system 770 can also include software elements (e.g., located within the one or more memory devices 786), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 8:
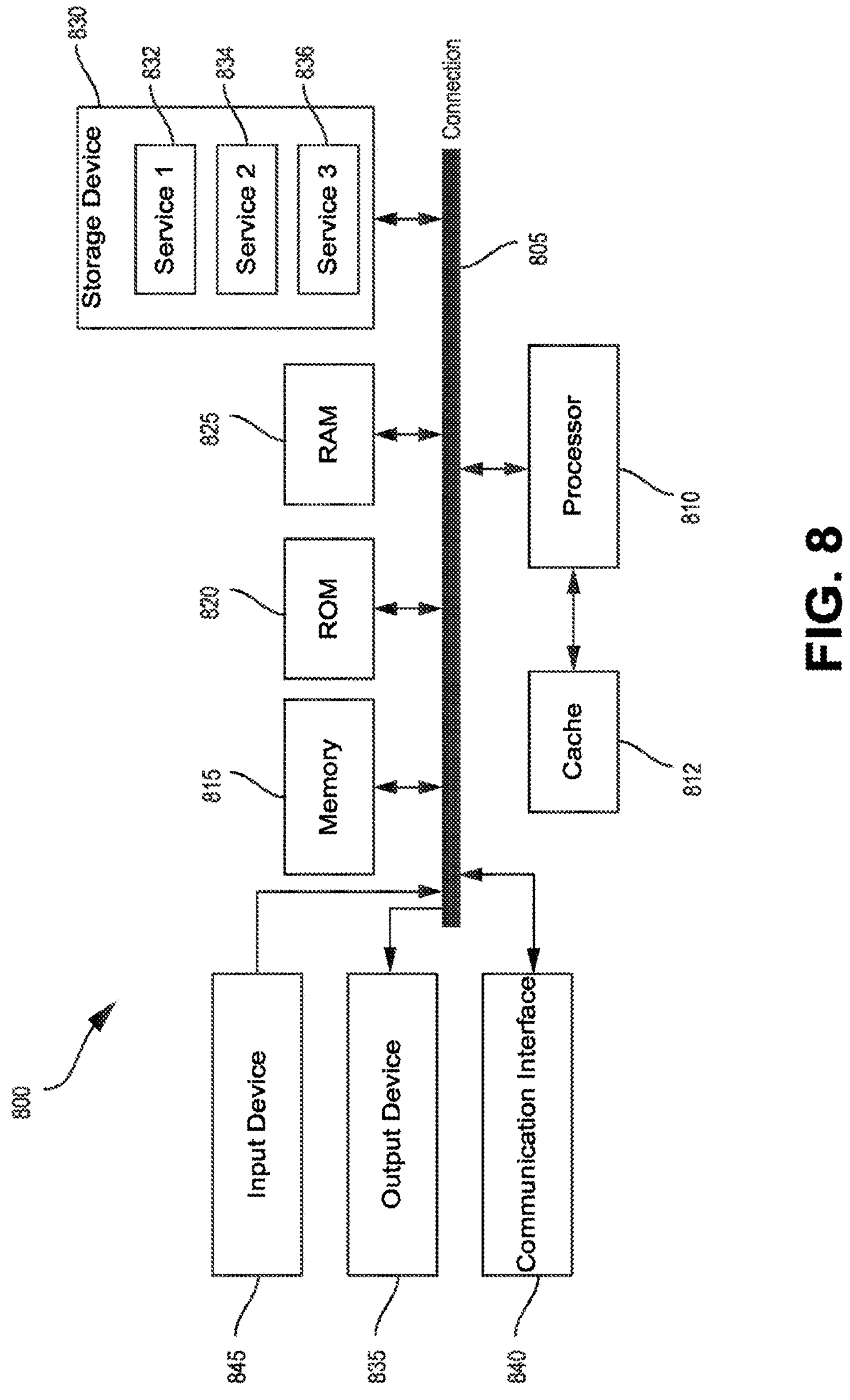
FIG. 8 illustrates an example computing system, according to aspects of the disclosure.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 915, such as read-only memory (ROM) 820 and random access memory (RAM) 925 to processor 810. Computing system 800 can include a cache 812 of high-speed memory connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be anon-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, or A and B and C. The language “at least one of” a set and/or “one or more” of a set does not limit the set to the items listed in the set. For example, claim language reciting “at least one of A and B” or “at least one of A or B” can mean A, B, or A and B, and can additionally include items not listed in the set of A and B.

Illustrative Aspects of the Disclosure Include:

Aspect 1: an apparatus for reporting location measurements, comprising: at least one transceiver; at least one memory; and at least one processor coupled to the at least one transceiver and the at least one memory and configured to: transmit, via the at least one transceiver, a first set of location measurements to a server; receive, via the at least one transceiver, a feedback message from the server based on the first set of location measurements; and transmit, via the at least one transceiver, a second set of location measurements to the server based on the feedback message.

Aspect 2: the apparatus of any of aspect 1, wherein the second set of location measurements comprises one or more measurements computed based on one or more of: a Positioning Reference Signal (PRS), or a Sounding Reference Signal (SRS), or a combination thereof.

Aspect 3: the apparatus of any of aspects 1-2, wherein the feedback message comprises identifier data identifying one or more resources associated with the PRS or the SRS, or a combination thereof.

Aspect 4: the apparatus of any of aspects 1-3, wherein the feedback message comprises information requesting a reduced transmission of one or more location measurements for a predetermined time.

Aspect 5: the apparatus of any of aspects 1-4, wherein the feedback message comprises information requesting a reduced transmission of a predetermined number of measurements in the second set of location measurements.

Aspect 6: the apparatus of any of aspects 1-5, wherein the feedback message comprises information requesting a change to a periodicity of location measurement reporting.

Aspect 7: the apparatus of any of aspects 1-6, wherein the feedback message comprises information indicating a number of requested location measurements from a particular TRP, a start time for location measurement modification, an end time for location measurement modification, a duration of location measurement modification, how to transmit one or more additional location measurements, or any combination thereof.

Aspect 8: the apparatus of any of aspects 1-7, wherein the feedback message is based on a number of the first set of location measurements exceeding a predetermined threshold.

Aspect 9: the apparatus of any of aspects 1-8, wherein the feedback message is based on one or more of: a Signal to Noise Ratio (SNR) metric, a Non-line of Sight (NLOS) metric for the first set of location measurements, a distance traveled metric, or an in-view status of a Transmission Receive Point, or a combination thereof.

Aspect 10: the apparatus of any of aspects 1-9, wherein the first set of location measurements is different from the second set of location measurements.

Aspect 11: the apparatus of any of aspects 1-10, wherein the first set of location measurement is transmitted to the server via a low-layer protocol.

Aspect 12: the apparatus of any of aspects 1-11, wherein a prioritization of the first set of location measurements is different from a prioritization of the second set of location measurements.

Aspect 13: the apparatus of any of aspects 1-12, wherein the feedback message comprises information requesting additional information for one or more specified measurements selected from among the second set of location measurements.

Aspect 14: the apparatus of any of aspects 1-13, wherein the additional information comprises one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

Aspect 15: a computer-implemented method, comprising: transmitting a first set of location measurements to a server; receiving a feedback message from the server based on the first set of location measurements; and transmitting a second set of location measurements to the server based on the feedback message.

Aspect 16: the computer-implemented method of aspect 15, wherein the second set of location measurements comprises one or more measurements computed based on one or more of: a Positioning Reference Signal (PRS), or a Sounding Reference Signal (SRS), or a combination thereof.

Aspect 17: the computer-implemented method of any of aspects 15-16, wherein the feedback message comprises identifier data identifying one or more resources associated with the PRS or the SRS, or a combination thereof.

Aspect 18: the computer-implemented method of any of aspects 15-17, wherein the feedback message comprises information requesting a reduced transmission of one or more location measurements for a predetermined time.

Aspect 19: the computer-implemented method of any of aspects 15-18, wherein the feedback message comprises information requesting a reduced transmission of a predetermined number of measurements in the second set of location measurements.

Aspect 20: the computer-implemented method of any of aspects 15-19, wherein the feedback message comprises information requesting a change to a periodicity of location measurement reporting.

Aspect 21: the computer-implemented method of any of aspects 15-20, wherein the feedback message comprises information indicating a number of requested location measurements from a particular TRP, a start time for location measurement modification, an end time for location measurement modification, a duration of location measurement modification, how to transmit one or more additional location measurements, or any combination thereof.

Aspect 22: the computer-implemented method of any of aspects 15-21, wherein the feedback message is based on a number of the first set of location measurements exceeding a predetermined threshold.

Aspect 23: the computer-implemented method of any of aspects 15-23, wherein the feedback message is based on one or more of: a Signal to Noise Ratio (SNR) metric, a Non-line of Sight (NLOS) metric for the first set of location measurements, a distance traveled metric, or an in-view status of a Transmission Receive Point, or a combination thereof.

Aspect 24: the computer-implemented method of any of aspects 15-23, wherein the first set of location measurements is different from the second set of location measurements.

Aspect 25: the computer-implemented method of any of aspects 15-24, wherein the first set of location measurement is transmitted to the server via a low-layer protocol.

Aspect 26: the computer-implemented method of any of aspects 15-25, wherein a prioritization of the first set of location measurements is different from a prioritization of the second set of location measurements.

Aspect: 27 the computer-implemented method of any of aspects 15-26, wherein the feedback message comprises information requesting additional information for one or more specified measurements selected from among the second set of location measurements.

Aspect 28: the computer-implemented method of any of aspects 15-27, wherein the additional information comprises one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

Aspect: 29: an apparatus, comprising: means for transmitting a first set of location measurements to a server; means for receiving a feedback message from the server based on the first set of location measurements; and means for transmitting a second set of location measurements to the server based on the feedback message.

Aspect 30: the apparatus of aspect 29, wherein the second set of location measurements comprises one or more measurements computed based on one or more of: a Positioning Reference Signal (PRS), or a Sounding Reference Signal (SRS), or a combination thereof.

Aspect 31: the apparatus of any of aspects 29-30, wherein the feedback message comprises identifier data identifying one or more resources associated with the PRS or the SRS, or a combination thereof.

Aspect 32: the apparatus of any of aspects 29-31, wherein the feedback message comprises information requesting a reduced transmission of one or more location measurements for a predetermined time.

Aspect 33: the apparatus of any of aspects 29-32, wherein the feedback message comprises information requesting a reduced transmission of a predetermined number of measurements in the second set of location measurements.

Aspect 34: the apparatus of any of aspects 29-33, wherein the feedback message comprises information requesting a change to a periodicity of location measurement reporting.

Aspect 35: the apparatus of any of aspects 29-34, wherein the feedback message comprises information indicating a number of requested location measurements from a particular TRP, a start time for location measurement modification, an end time for location measurement modification, a duration of location measurement modification, how to transmit one or more additional location measurements, or any combination thereof.

Aspect 36: the apparatus of any of aspects 29-35, wherein the feedback message is based on a number of the first set of location measurements exceeding a predetermined threshold.

Aspect 37: the apparatus of any of aspects 29-36, wherein the feedback message is based on one or more of: a Signal to Noise Ratio (SNR) metric, a Non-line of Sight (NLOS) metric for the first set of location measurements, a distance traveled metric, or an in-view status of a Transmission Receive Point, or a combination thereof.

Aspect 38: the apparatus of any of aspects 29-37, wherein the first set of location measurements is different from the second set of location measurements.

Aspect 39: the apparatus of any of aspects 29-38, wherein the first set of location measurement is transmitted to the server via a low-layer protocol.

Aspect 40: the apparatus of any of aspects 29-39, wherein a prioritization of the first set of location measurements is different from a prioritization of the second set of location measurements.

Aspect 41: the apparatus of any of aspects 29-40, wherein the feedback message comprises information requesting additional information for one or more specified measurements selected from among the second set of location measurements.

Aspect 42: the apparatus of any of aspects 29-42, wherein the additional information comprises one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

Aspect 43: a computer-readable medium comprising at least one instruction for causing a computer or processor to: transmit a first set of location measurements to a server; receive a feedback message from the server based on the first set of location measurements; and transmit a second set of location measurements to the server based on the feedback message.

Aspect 44: the computer-readable medium of aspect 43, wherein the second set of location measurements comprises one or more measurements computed based on one or more of: a Positioning Reference Signal (PRS), or a Sounding Reference Signal (SRS), or a combination thereof.

Aspect 45: the computer-readable medium of any of aspects 43-44, wherein the feedback message comprises identifier data identifying one or more resources associated with the PRS or the SRS, or a combination thereof.

Aspect 46: the computer-readable medium of any of aspects 43-45, further comprising at least one instruction for causing a computer or processor to perform operations according to any of aspects 15-28.

What is claimed is:

1. An apparatus for reporting location measurements, the apparatus comprising:

at least one transceiver;

at least one memory; and at least one processor coupled to the at least one transceiver and the at least one memory and configured to:

transmit, via the at least one transceiver, a first set of location measurements to a server;

receive, via the at least one transceiver, a feedback message from the server based on the first set of location measurements, wherein the feedback message comprises information indicating a number of requested location measurements from a particular transmission-reception point (TRP); and transmit, via the at least one transceiver, a second set of location measurements to the server based on the feedback message.

2. The apparatus of claim 1, wherein the second set of location measurements comprises one or more measurements computed based on one or more of: a Positioning Reference Signal (PRS), or a Sounding Reference Signal (SRS), or a combination thereof.

3. The apparatus of claim 2, wherein the feedback message comprises identifier data identifying one or more resources associated with the PRS or the SRS for which reporting is to be suppressed, or a combination thereof.

4. The apparatus of claim 1, wherein the feedback message comprises information requesting a reduced transmission of one or more location measurements for a predetermined time.

5. The apparatus of claim 1, wherein the feedback message comprises information requesting a reduced transmission of a predetermined number of measurements in the second set of location measurements.

6. The apparatus of claim 1, wherein the feedback message comprises information requesting a change to a periodicity of location measurement reporting.

7. The apparatus of claim 1, wherein the feedback message further comprises information indicating.

8. The apparatus of claim 1, wherein the feedback message is based on a number of the first set of location measurements exceeding a predetermined threshold.

9. The apparatus of claim 1, wherein the feedback message is based on one or more of: a Signal to Noise Ratio (SNR) metric, a Non-line of Sight (NLOS) metric for the first set of location measurements, a distance traveled metric, or an in-view status of a Transmission Receive Point, or a combination thereof.

10. The apparatus of claim 1, wherein the first set of location measurements is different from the second set of location measurements.

11. The apparatus of claim 1, wherein the first set of location measurements is transmitted to the server via a low-layer protocol.

12. The apparatus of claim 1, wherein a prioritization of the first set of location measurements is different from a prioritization of the second set of location measurements.

13. The apparatus of claim 1, wherein the feedback message comprises information requesting additional information for one or more specified measurements selected from among the second set of location measurements.

14. The apparatus of claim 13, wherein the additional information comprises one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

15. A computer-implemented method for reporting location measurements, comprising:

transmitting a first set of location measurements to a server;

receiving a feedback message from the server based on the first set of location measurements, wherein the feedback message comprises information indicating a number of requested location measurements from a particular transmission-reception point (TRP); and transmitting a second set of location measurements to the server based on the feedback message.

16. The computer-implemented method of claim 15, wherein the second set of location measurements comprises one or more measurements computed based on one or more of: a Positioning Reference Signal (PRS), or a Sounding Reference Signal (SRS), or a combination thereof.

17. The computer-implemented method of claim 16, wherein the feedback message comprises identifier data identifying one or more resources associated with the PRS or the SRS for which reporting is to be suppressed, or a combination thereof.

18. The computer-implemented method of claim 15, wherein the feedback message comprises information requesting a reduced transmission of one or more location measurements for a predetermined time.

19. The computer-implemented method of claim 15, wherein the feedback message comprises information requesting a reduced transmission of a predetermined number of measurements in the second set of location measurements.

20. The computer-implemented method of claim 15, wherein the feedback message comprises information requesting a change to a periodicity of location measurement reporting.

21. The computer-implemented method of claim 15, wherein the feedback message further comprises information indicating.

22. The computer-implemented method of claim 15, wherein the feedback message is based on a number of the first set of location measurements exceeding a predetermined threshold.

23. The computer-implemented method of claim 15, wherein the feedback message is based on one or more of: a Signal to Noise Ratio (SNR) metric, a Non-line of Sight (NLOS) metric for the first set of location measurements, a distance traveled metric, or an in-view status of a Transmission Receive Point, or a combination thereof.

24. The computer-implemented method of claim 15, wherein the first set of location measurements is different from the second set of location measurements.

25. The computer-implemented method of claim 15, wherein the first set of location measurements is transmitted to the server via a low-layer protocol.

26. The computer-implemented method of claim 15, wherein a prioritization of the first set of location measurements is different from a prioritization of the second set of location measurements.

27. The computer-implemented method of claim 15, wherein the feedback message comprises information requesting additional information for one or more specified measurements selected from among the second set of location measurements.

28. The computer-implemented method of claim 27, wherein the additional information comprises one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

29. An apparatus for reporting location measurements, the apparatus comprising:

means for transmitting a first set of location measurements to a server;

means for receiving a feedback message from the server based on the first set of location measurements, wherein the feedback message comprises information indicating a number of requested location measurements from a particular transmission-reception point (TRP); and means for transmitting a second set of location measurements to the server based on the feedback message.

30. The apparatus of claim 29, wherein the second set of location measurements comprises one or more measurements computed based on one or more of: a Positioning Reference Signal (PRS), or a Sounding Reference Signal (SRS), or a combination thereof.

31. The apparatus of claim 30, wherein the feedback message comprises identifier data identifying one or more resources associated with the PRS or the SRS for which reporting is to be suppressed, or a combination thereof.

32. The apparatus of claim 29, wherein the feedback message comprises information requesting a reduced transmission of one or more location measurements for a predetermined time.

33. The apparatus of claim 29, wherein the feedback message comprises information requesting a reduced transmission of a predetermined number of measurements in the second set of location measurements.

34. The apparatus of claim 29, wherein the feedback message comprises information requesting a change to a periodicity of location measurement reporting.

35. The apparatus of claim 29, wherein the feedback message comprises information indicating.

36. The apparatus of claim 29, wherein the feedback message is based on a number of the first set of location measurements exceeding a predetermined threshold.

37. The apparatus of claim 29, wherein the feedback message is based on one or more of: a Signal to Noise Ratio (SNR) metric, a Non-line of Sight (NLOS) metric for the first set of location measurements, a distance traveled metric, or an in-view status of a Transmission Receive Point, or a combination thereof.

38. The apparatus of claim 29, wherein the first set of location measurements is different from the second set of location measurements.

39. The apparatus of claim 29, wherein the first set of location measurements is transmitted to the server via a low-layer protocol.

40. The apparatus of claim 29, wherein a prioritization of the first set of location measurements is different from a prioritization of the second set of location measurements.

41. The apparatus of claim 29, wherein the feedback message comprises information requesting additional information for one or more specified measurements selected from among the second set of location measurements.

42. The apparatus of claim 41, wherein the additional information comprises one or more of: path information, an angle of arrival (AoA), an angle of departure (AoD), a Round Trip Time (RTT), a time delay calibration value, a Signal to Noise Ratio (SNR), a Signal-to-interference-plus Noise Ratio (SINR), a line-of-sight (LOS) probability, or a combination thereof.

43. A non-transitory, computer-readable medium comprising at least one instruction for causing a computer or processor to:

transmit a first set of location measurements to a server;

receive a feedback message from the server based on the first set of location measurements, wherein the feedback message comprises information indicating a number of requested location measurements from a particular transmission-reception point (TRP); and transmit a second set of location measurements to the server based on the feedback message.

44. The non-transitory, computer-readable medium of claim 43, wherein the second set of location measurements comprises one or more measurements computed based on one or more of: a Positioning Reference Signal (PRS), or a Sounding Reference Signal (SRS), or a combination thereof.

45. The non-transitory, computer-readable medium of claim 44, wherein the feedback message comprises identifier data identifying one or more resources associated with the PRS or the SRS for which reporting is to be suppressed, or a combination thereof.

* * * * *